2,767,211

MANUFACTURE OF 2,4,5-TRICHLOROPHENOXY ACETIC ACID

Robert H. Cooper, Nitro, W. Va., assignor to Monsanto Chemical Company, St. Louis, Mo., a corporation of Delaware No Drawing. Application September 30, 1952, Serial No. 312,411

5 Claims. (Cl. 260—521)

The present invention relates to the manufacture of 2,4,5-trichlorophenoxy acetic acid in alkaline solution. Conducting the reaction between sodium 2,4,5-trichlorophenate and sodium chloroacetate in effected most convenietnly and cheaply in aqueous medium. However, the yields by this procedure from technical sodium 2,4,5-trichlorophenate have tended to be low. The fact that the product is essentially insoluble in water renders it difficult to maintain a homogeneous reaction mixture. In contrast thereto the preparation of 2,4-dichlorophenoxy acetic acid can be effected very readily under these conditions.

In accordance with the present invention it has been found that higher yields result when a solution of sodium chloroacetate is added to a solution of sodium 2,4,5-trichlorophenate at reaction temperature. Furthermore, it is advantageous to carry out the reaction in concentrated solution no matter how the reactants are mixed although still better results are obtained by adding the sodium chloroacetate to a hot solution of the trichlorophenate. Thus, the preferred procedure is gradually to add to a concentrated solution of sodium 2,4,5-trichlorophenate at reaction temperature, a solution of sodium chloroacetate and adding water if necessary during the reaction to keep the reaction mixture fluid.

The following detailed examples illustrate the principles of the invention.

Example 1

A solution of 0.25 molecular proportion of sodium 2,4,5-trichlorophenate in 3.86 molecular proportions of water was prepared by admixing 50 parts by weight (0.25 molecular proportion) of 2,4,5-trichlorophenol, 40 parts by weight of 25% aqueous caustic soda and 35 parts by weight of water. A solution of 0.25 molecular proportion of sodium chloroacetate in 2.56 molecular proportions of water was prepared by dissolving 17.5 parts by weight (0.165 molecular proportion) of sodium carbonate in 44 parts by weight of water and adding it to 23.6 parts by weight (0.25 molecular proportion) of monochlor acetic acid. The solution of sodium 2,4,5-trichlorophenate was heated to 95°–100° C. and to the hot solution there was added the sodium chloroacetate solution over a period of ¾ hour. The reaction mixture was heated at 95°–100° C. for an additional 2½ hours with continued stirring. At the end of the heating period 10 parts by weight of 25% aqueous caustic soda (0.0625 molecular proportion) and 50 parts by weight of water were added, bringing the total water to 38.5 moles per mole of sodium monochloroacetate. The reaction mixture was then cooled to 30° C., filtered and the solid product washed with 100–200 parts by weight of an aqueous solution containing 8% sodium chloride and 2% sodium hydroxide. The sodium 2,4,5-trichlorophenoxy acetate was then dissolved in hot water and the hot solution filtered to remove any insoluble impurities and then acidified with 77.5% sulfuric acid until a sample of the liquid showed no milkiness upon the addition of acid. The mass was then cooled to 30° C. and 2,4,5-trichlorophenoxy acetic acid separated by filtration, washed with water and dried. A yield of 75.1% based on the monochlor acetic acid was obtained, M. P. 158° C.

Other preparations were carried out in exactly the same way except that the temperature at which the sodium chloroacetate solution was added varied and the temperature of final heating varied. Otherwise the contions and times were identical with those described above. In the first column of the table below is set forth the temperature at which the sodium monochloroacetate solution was aded over the ¾ hour period and the second column records the temperature of the final 2½ hour heating.

| Temp., °C., of sodium monochloroacetate Addition | Final Heating | Percent Yield on Monochlor Acetic Acid |
|---|---|---|
| 95–100 | 95–100 | 75.1 |
| 103–105 | 103–105 | 73.5 |
| 20–25 | 95–100 | 66.5 |
| 30 | 75–80 | 51.0 |

It is evident that significantly higher yields are obtained by adding the sodium monochloroacetate at a temperature at which condensation is rapidly effected. Furthermore, by maintaining a temperature of 95° C. or above, foaming of the reaction mixture is mitigated. It will be noted, however, that there is no advantage in having the temperature greater than in the range of 95°–100° C. The optimum time of addition of sodium monochloroacetate is within the range of ¾ to 1 hour, no difference in yield being observed between these limits. On the other hand reducing the time of addition to ½ hour decreased the yield about 8%. Increasing the time of addition to 1½ hours did not result in any significant change in yield, illustrating that there is no advantage in prolonging the time of addition.

It is advantageous to add caustic soda at the end of the reaction period since this keeps any unreacted trichlorophenol in solution and greatly aids filtration. A fibrous precipitate results which filters and washes much more readily than if no further alkali is added. Generally 0.25–0.50 mole per mole of chloroacetate is sufficient. However, there is no advantage in adding the alkali during the reaction period and this does in fact tend to lower the yield. The reaction is effected most efficiently at a pH within the range of 9.5 to 11.5. Thus, the pH of the sodium trichlorophenate solution is preferably adjusted until just alkaline to thymolphthalein. This alkalinity should be maintained where necessary by the addition of caustic soda as needed. However, as has been stated, the presence of excess alkali decreases the yield considerably.

The water content during the reaction is preferably the minimum required for a homogeneous reaction mixture. This quantity will vary depending upon the size of the operation and on the efficiency of the stirring. In commercial operations it is advantageous to add water during the reaction. The quantity of water at the end of the reaction may vary between 18 and 50 moles per mole of sodium chloroacetate, the preferred range being 25 to 35. On the other hand the amount of water added at the end of the heating period is not significant. Whatever quantity is convenient may be added as it has no influence on the yield. The effect of concentration is illustrated in the following example.

Example 2

The initial reaction in this series was carried out in solutions even more concentrated than that described above. A solution of 1.5 molecular proportions of sodium trichlorophenate was prepared by dissolving 297 parts by weight (1.5 molecular proportions) of 2,4,5- trichlorophenol in 240 parts by weight of 25% aqueous caustic soda. A solution of 1.5 molecular proportions of sodium monochloroacetate was prepared by dissolving 105 parts by weight of sodium carbonate in 264 parts by weight of water and adding 142.5 parts by weight (1.5 molecular proportions) of monochlor acetic acid. The reaction was carried out as described under Example 1 by adding sodium monochloroacetate in 1 hour to the sodium trichlorophenate solution at 95°–100° C. followed by a heating period of 2½ hours at this temperature, adding 300 parts by weight of water and 60 parts by weight of 25% sodium hydroxide and isolating the product as described above.

Similar reactions were carried out employing 0.25 molar quantities of the reagents exactly as described in Example 1 except that the quantity of water added during the reaction varied. For purposes of comparison the data for the initial experiment described under Example 1 are contained in the second line in the table below. In the last two runs 70 and 136 parts by weight of water respectively were employed to make up the sodium trichlorophenate solution instead of the 35 parts by weight employed in Example 1. The data in the table do not include water added after the reaction is completed.

| Run | Moles of Water per mole of— | | Total Water Moles per mole sodium monochloroAcetate | Yield on Monochloroacetate Percent |
|---|---|---|---|---|
| | Sodium monochloroacetate Solution | Sodium 2,4,5-trichlorophenate Solution | | |
| A | 10.26 | 7.66 | 17.9 | 68.0 |
| B | 10.26 | 15.44 | 25.7 | 75.1 |
| C | 10.26 | 23.21 | 33.5 | 70.4 |
| D | 10.26 | 37.88 | 48.1 | 64.2 |

*Example 3*

Sodium trichlorophenate salt solution was adjusted to a pH of about 10.1–10.3 (alkaline to thymolphthalein) by addition of 25% caustic soda. The final composition was approximately 1496 parts by weight (6.8 molecular proportions) of sodium trichlorophenate, 675 parts by weight of salt and 2357 parts by weight (130.9 molecular proportions) of water. The solution was heated to 90° C. and thereto was added over a period of 92 minutes a sodium monochloroacetate solution comprising approximately 793.6 parts by weight (6.8 molecular proportions) of sodium monochloroacetate in 1311 parts by weight (73.0 molecular proportions) of water. The reaction mixture was stirred and the temperature maintained within the range of 98°–105° C. during the addition of the sodium monochloroacetate solution and the reaction mixture then heated for 170 minutes at 91°–99° C. During the addition of the sodium monochloroacetate solution water was added as follows:

After 41 minutes 415 parts by weight
After 67 minutes 415 parts by weight
After 92 minutes 415 parts by weight Heating and stirring was then continued for 20 minutes at a temperature of about 97°–99° C. and 1245 parts by weight of water added, bringing the total to 50.3 molecular proportions per mole of sodium monochloroacetate. Heating and stirring was continued for 2 hours and 20 minutes at 91°–98° C. and then 400 parts by weight of 25% aqueous caustic soda and 2905 parts by weight of water added. The product was isolated as described in the foregoing examples. The yield was comparable to that obtained in Example 2, run D.

The reactions described were carried out with equal molecular proportions of the reactants since it has been found that an excess affords no significant advantage. Employing more than the theoretical amount of sodium monochloroacetate gave no increase in yield based either on monochloroacetate or trichlorophenol. Furthermore, as much as 100% excess of trichlorophenol was required before there was any significant increase in yield based on the monochloroacetate from which it is evident that the large excess which must be employed to effect a small increase in yield is not economical. Of course potassium salts and potassium hydroxide may replace the sodium salts and sodium hydroxide but this reagent is more expensive and furthermore no advantage was obtained by the substitution.

It is intended to cover all changes and modifications of the examples of the invention herein chosen for purposes of disclosure which do not constitute departures from the spirit and scope of the invention.

What is claimed is:

1. In the manufacture of sodium 2,4,5-trichlorophenoxyacetate by condensing 2,4,5-trichlorophenol and chloracetic acid in alkaline solution the improvement which comprises gradually adding an aqueous solution of sodium chloroacetate to an aqueous solution of sodium 2,4,5-trichlorophenate at a temperature within the range of 90° C. to refluxing temperature under atmospheric pressure the moles of sodium chloroacetate added being approximately equal to the moles of sodium 2,4,5-trichlorophenate contained in the reaction mixture initially and the total water in the reaction mixture being within the range of 17 to 47 moles of water per mole of sodium chloroacetate, continuing the heating to complete the reaction, and recovering the product from the reaction mixture.

2. In the manufacture of sodium 2,4,5-trichlorophenoxyacetate by condensing 2,4,5-trichlorophenol and chloracetic acid in alkaline solution the improvement which comprises gradually adding an aqueous solution of sodium chloroacetate to an aqueous solution of sodium 2,4,5-trichlorophenate at a temperature within the range of 95° C. to refluxing temperature under atmospheric pressure, the reactants being in approximately stoichiometric proportion and the total water in the reaction mixture being within the range of 25 to 35 moles per mole of sodium chloroacetate, continuing the heating to complete the reaction, adding water as required just sufficient to keep the reaction mixture homogeneous and recovering the solid product.

3. The method of claim 2 in which the sodium chloroacetate solution is added over a period of about 45–60 minutes and heating is continued for about 2½ hours.

4. The method of claim 2 in which sodium hydroxide in the range of 0.25–0.50 mole per mole of sodium chloroacetate are added at the end of the reaction before recovering the product.

5. In the manufacture of sodium 2,4,5-trichlorophenoxyacetate by condensing 2,4,5-trichlorophenol and chloroacetic acid in alkaline solution the improvement which comprises gradually adding an aqueous solution of sodium chloroacetate to sodium 2,4,5-trichlorophenate in aqueous medium while stirring the reaction mixture and heating at a temperature within the range of 90° C. to refluxing temperature under atmospheric pressure, the moles of sodium chloroacetate added being approximately equal to the moles of sodium 2,4,5-trichlorophenate contained in the reaction mixture initially, maintaining sufficient water in the reaction mixture to keep it fluid enough for mixing but confining the total water present during the reaction with the range of about 17–50 moles per mole of sodium chloroacetate.

References Cited in the file of this patent

UNITED STATES PATENTS

| | | |
|---|---|---|
| 2,516,611 | Berhenke et al. | July 25, 1950 |
| 2,598,692 | Henrich | June 3, 1952 |
| 2,599,250 | Fusco | June 3, 1952 |